United States Patent [19]

Okino

[11] Patent Number: 5,001,552
[45] Date of Patent: Mar. 19, 1991

[54] WHITE BALANCE CORRECTION USING PRESTORED FLASH LAMP COLOR TEMPERATURE DATA

[75] Inventor: Tadashi Okino, Kanagawa, Japan

[73] Assignee: Canon Kabushiki Kaisha, Tokyo, Japan

[21] Appl. No.: 328,877

[22] Filed: Mar. 27, 1989

Related U.S. Application Data

[63] Continuation of Ser. No. 99,620, Sep. 22, 1987, Pat. No. 4,847,680.

[30] Foreign Application Priority Data

Sep. 24, 1986 [JP] Japan .................. 61-223826
Nov. 4, 1986 [JP] Japan .................. 61-260602
Nov. 4, 1986 [JP] Japan .................. 61-260603
Nov. 4, 1986 [JP] Japan .................. 61-260604

[51] Int. Cl.$^5$ ............................................. H04N 9/73
[52] U.S. Cl. ......................................... 358/29; 358/41

[58] Field of Search ............................. 358/29, 41, 43

[56] References Cited

U.S. PATENT DOCUMENTS 3,627,911 12/1971 Kubota et al. ................ 358/29 C
4,274,107  6/1981 Tamura et al. ............... 358/29 C
4,395,730  7/1983 Shen ........................... 358/29 C
4,679,066  7/1987 Masunaga et al. ........... 358/29 C
4,847,680  7/1989 Okino ........................... 358/29

Primary Examiner—James J. Groody
Assistant Examiner—Mark R. Powell
Attorney, Agent, or Firm—Robin, Blecker, Daley & Driscoll

[57] ABSTRACT

Color temperature data of a flash lamp is stored in a memory device. Ambient light color temperature data, without the flash, is detected. White balance is adjusted based on the stored data and the detected data.

14 Claims, 12 Drawing Sheets

WHITE BALANCE CORRECTION USING PRESTORED FLASH LAMP COLOR TEMPERATURE DATA

This application is a continuation of Ser. No. 99,620, filed Sept. 22, 1987, now U.S. Pat. No. 4,847,680.

BACKGROUND OF THE INVENTION

1. Field of the Invention

This invention relates to an image pickup apparatus and more particularly to a photo-electric converting type image sensing apparatus which is often used in combination with an object illuminating device.

2. Description of the Related Art

The sensitivity of image sensors which have been used for the image pickup apparatuses of the above stated kind is not always sufficient for image sensing conditions. In the event of an image pickup operation in a dark place, insufficient sensitivity of the image sensor is compensated for by illuminating an image sensing object with an illuminating device. Such illumination has been also used as an auxiliary light for softening the shadow of the object.

However, a photographing (or image pickup) operation using an illuminating device (or a flash device) is not always performed under dark conditions. Further, on some occasions, a contribution from coexisting stationary (ambient) light is not ignorable even in the event of photographing with flash because of low intensity of the flash light due, for example, to a high reflection factor of the object or the like.

Under such conditions, mere white balance adjustment of the image pickup apparatus solely for an ambient light or solely for the flash light hardly permits accurate color reproduction.

SUMMARY OF THE INVENTION

This invention is made in view of the above stated problem of the prior art. It is therefore a principal object of this invention to provide an image pickup apparatus which is capable of giving an apposite white balance for both the illumination by existing stationary ambient light on the photographing object and the auxiliary illumination by an illuminating device.

To attain this object, an embodiment of this invention is provided with a light source (or an illuminating device) which is capable of continuously changing the hue of the light thereof and also with a colorimetric circuit. The embodiment is thus arranged to measure the hue of ambient light obtained without the light of an illuminating device and then to cause the illuminating device to illuminate the object by generating a light of the same hue as that of the ambient light.

The embodiment arranged in this manner is capable of reproducing an image in its original color with a white balance obtained appositely to both the existing ambient light and the light of the illuminating device employed.

Further, to attain this object, another embodiment of this invention is arranged to separately measure the quantity of light obtained by the ambient light from that of light obtained by flash illumination; and to make white balance adjustment by prorating the amplifying gain of the ambient light and that of flash illumination according to a ratio between the two light quantities thus separately measured.

More specifically, the image pickup apparatus which is arranged according to this invention to have an optical image formed on an image sensor and to take out the image by converting it into a plurality of color or chrominance signals comprises' flashing means; storage means for storing color temperature data relative to the flashing means; light measuring means arranged to measure the luminance intensity of ambient light and that of light emitted by the flashing means separately from each other; color measuring means for measuring color temperature due to the ambient light; amplifying means for controlling the balance between the color signals formed by the image sensor; and control means for controlling an amplification gain of the amplifying means according to the value of the luminance intensity measured by the light measuring means, the value of the color temperature. measured by the color measuring means and the color temperature data relative to the flashing means.

The above stated arrangement, enables the embodiment to obtain a white balance according to both the color temperature of the ambient light and that of the flash light in cases where the contributions of both of them are not ignorable.

To attain the above stated object, a further embodiment of this invention adjusts a white balance on the basis of measured values of the light quantity of a flash light and that of an ambient light. More specifically, an image pickup apparatus arranged according to this invention to have an optical image formed on the surface of an image sensor and to take out the image by converting it into a plurality of chrominance or color signals comprises: flash means; storage means for storing color temperature data about the light of the flash means; first detecting means arranged to measure the luminance intensity of the flash light of said flash means; second detecting means arranged to measure the luminance of a photographing object resulting from ambient light; color measuring means for measuring color temperature resulting from the ambient light; amplifying means arranged to control a balance between the color signals produced from said image sensor; white balance adjusting means arranged to adjust a white balance by controlling the amplification gain of the amplifying means according to the measured values obtained by the first and second detecting means, the value of color temperature measured by the color measuring means and the value of the color temperature data about the flash means.

The embodiment arranged in this manner is capable of obtaining a white balance on the basis of both the color temperature of the ambient light and that of the flash light according to their weights in case of photographing where both the contributions of the ambient light and the flash light are not ignorable.

Further, to attain the above stated object, a still further embodiment of this invention is arranged to make white balance adjustment on the basis of light quantity values obtained by accumulating and storing, over an exposure time, the light quantity of flash light and that of ambient light by dividing each of them into two primary colors of, for example, red and blue.

More specifically, an image pickup apparatus which is arranged as the above stated embodiment to have an optical image formed on the surface of an image sensor and to take out the image by converting it into a plurality of chrominance signals comprises' flash means; color measuring means arranged to measure, over the exposure time of the image sensor, color temperature information on the flash light of the flash means and color temperature information on ambient light other than the flash light; and adjusting means for adjusting the color balance of the chrominance signals produced from the image sensor according to the overall color temperature value measured by the color measuring means. Therefore, in case of photographing where contributions of both the ambient light and the flash light are not ignorable, a white balance is obtainable according to the color temperature of both of them.

Other objects and features of this invention will become apparent from the following detailed description of embodiments thereof taken in connection with the accompanying drawings.

DETAILED DESCRIPTION OF THE PREFERRED EMBODIMENTS

Figure 1:
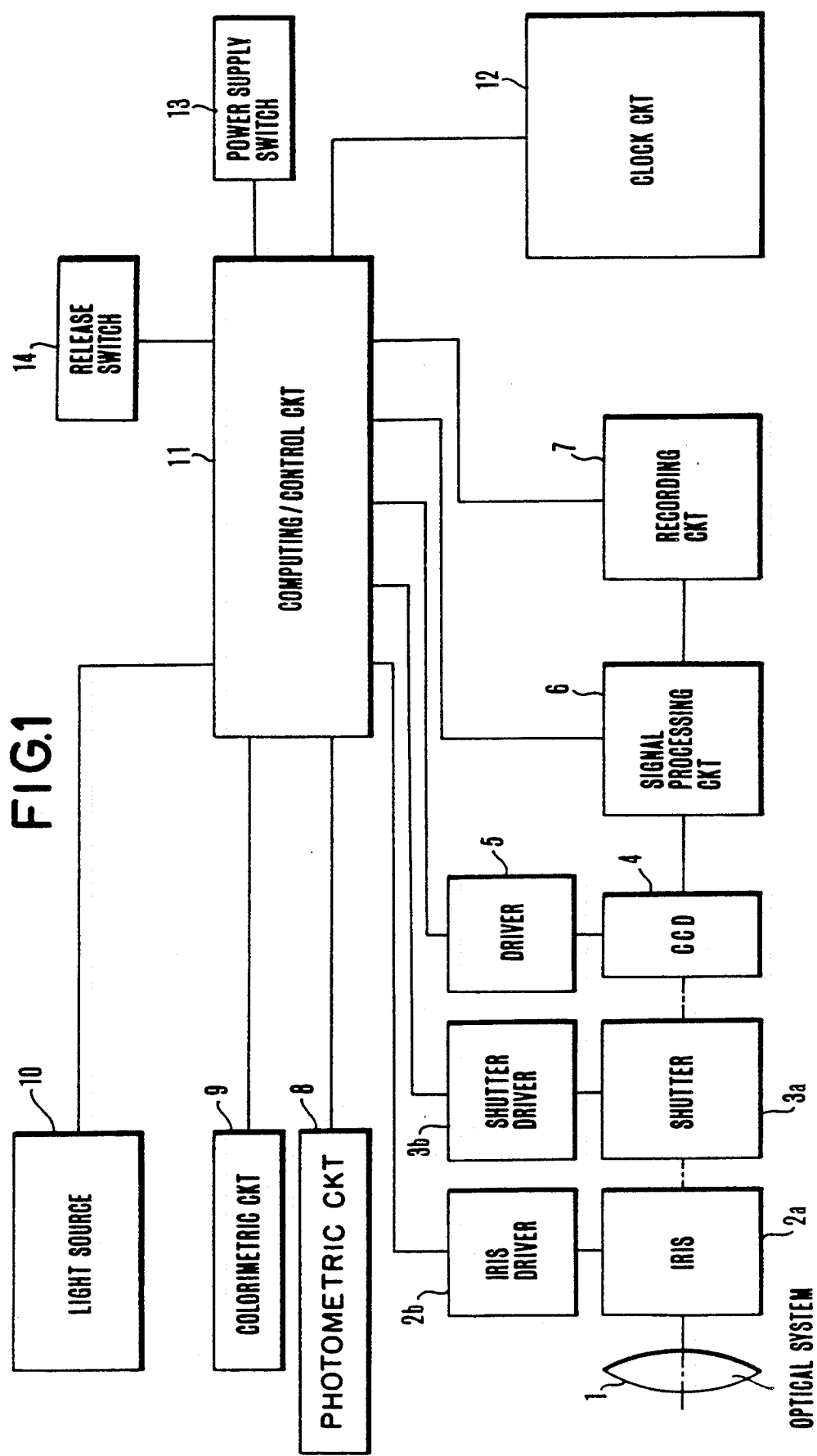
FIG. 1 is a block diagram showing the electric circuit of an image pickup device arranged according to this invention as a first embodiment thereof.

This invention is further described through the following description of embodiments thereof:

FIG. 1 shows in a block diagram the electric circuit of a photo-electric converting type image pickup apparatus arranged as a first embodiment of this invention. An optical system 1 consists of optical lenses, etc. which are arranged to form on the surface of an image sensor 4 an image of an object to be photographed. The embodiment comprises an iris (stop) 2a and a driver 2b for the iris; a shutter 3a and a driver 3b for the shutter; and the image sensor 4 which is arranged to convert an image of the object into an electrical signal. The image sensor 4 may be a camera tube, a CCD (charge coupled device), an MOS type solid-state image sensor or the like.

Referring further to FIG. 1, a driver 5 is arranged to drive the image sensor 4. A signal processing circuit 6 is arranged to convert an electrical signal read out from the image sensor 4 into the prescribed form of a video signal. A recording circuit 7 is arranged to record the video signal on a recording medium, such as a magnetic tape or a magnetic disc. A photometric circuit 8 is arranged to measure the luminance of an object to be photographed. A colorimetric circuit 9 is arranged to measure the hue of light with which the object is illuminated. A light source 10 is arranged to provide an object illuminating light in the event of an object having an insufficient degree of luminance. As will be further described later on, this light source 10 permits adjustment of the hue (color temperature) of the light thereof. A computing/control circuit 11 is arranged to control applicable parts by performing various computing operations and making discriminations as necessary. A clock circuit 12 is arranged to determine the operation timing of the various parts. A reference numeral 13 denotes a power supply switch. A release switch 14 is arranged to enable the photographer to designate the timing of photographing.

Figure 2:
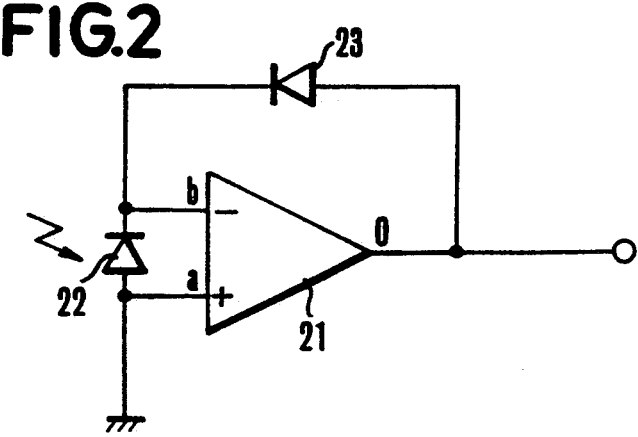
FIG. 2 is a circuit diagram showing the photometric circuit of the embodiment.

The photometric circuit 8 can be easily arranged by means of a known circuit as shown in FIG. 2. FIG. 2 includes an operational amplifier 21; a light receiving element 22 which is, for example, a silicon photo diode or the like and has a short-circuit current in proportion to the intensity of light incident thereon. A reference numeral 23 denotes a diode. In this circuit, a voltage Vo which is generated at the output terminal O of the operational amplifier 21 can be expressed as:

$$Vo = \frac{kT}{q} \ln \frac{Ispc}{Is} \quad (1)$$

wherein,
k: Boltzmann constant
T: ambient temp. (absolute temp.)
q: electric charge of one electron
Is: reverse saturation current of diode 23
Ispec: forward current flowing to diode 23 (=photo current flowing to light receiving element 22 ∝ intensity of light received)

In other words, the light measurement output voltage Vo is proportional to the natural logarithm of the intensity of light received and can be expressed as:

$$\frac{kT}{q} \ln 2 \simeq 18 \text{ mV} \quad (2)$$

Therefore, the voltage Vo increases by 18 mV every time the luminance of the object (∝ the receiving light intensity of the photometric circuit 8) increases two times. The luminance of the object can be found by measuring the voltage output of the circuit 8.

Figure 3:
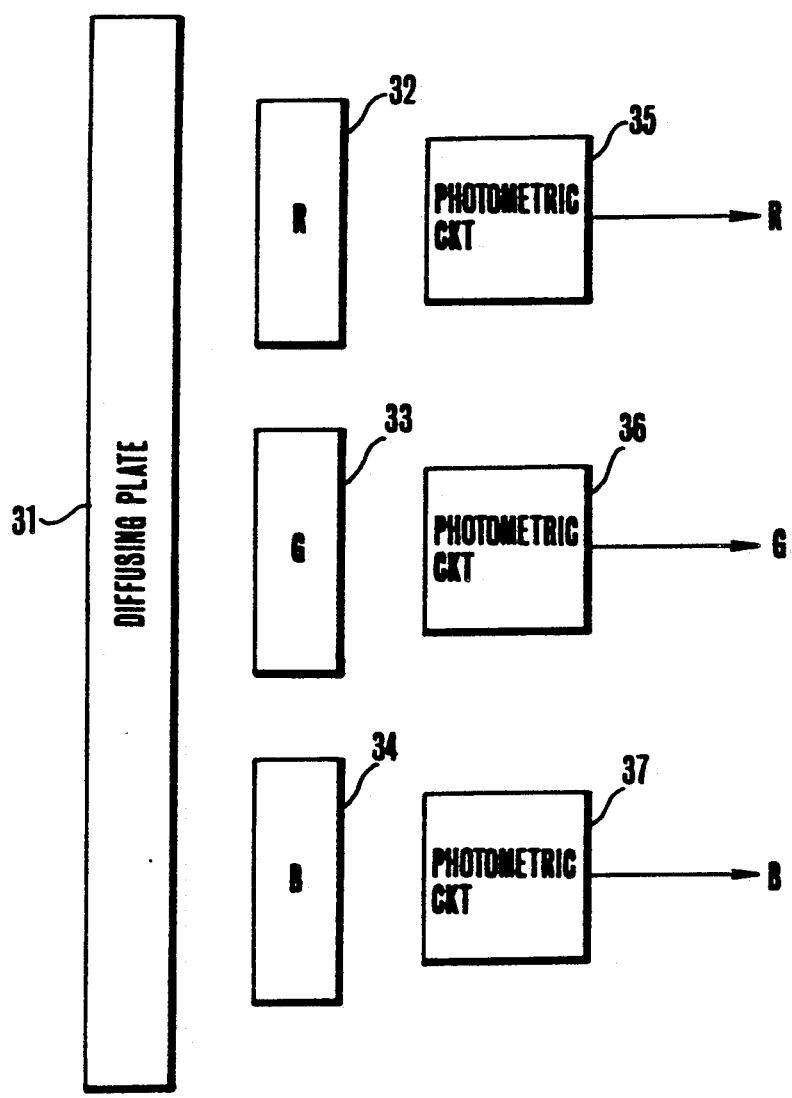
FIG. 3 is a diagram showing the colorimetric circuit of the embodiment.

The colorimetric circuit 9 of FIG. 1 can be arranged as shown in FIG. 3 in accordance with a known circuit arrangement. Referring to FIG. 3, a reference numeral 31 denotes a diffusing plate. Numerals 32, 33 and 34 denote color filters, which are arranged to transmit, for example, only the colors R (red), G (green) and B (blue) respectively. Numerals 35, 36 and 37 denote photometric circuits which are similar to the photometric circuit shown in FIG. 2 respectively. In this circuit arrangement, a difference between the outputs of the two photometric circuits 35 and 36 can be expressed as follows:

$$\frac{kT}{q} \ln \frac{Ispc(G)}{Is} - \frac{kT}{q} \ln \frac{Ispc(R)}{Is} = \frac{kT}{q} \ln \frac{Ispc(G)}{Ispc(R)} \quad (3)$$

Therefore, this gives a ratio between the green (G) and red (R) components of the light incident on the colorimetric circuit 9.

Likewise, a difference between the outputs of the two photometric circuits 36 and 37 can be expressed as follows:

$$\frac{kT}{q} \ln \frac{Ispc(G)}{Ispc(B)} \quad (4)$$

That gives a ratio between the green (G) and blue (B) components of the light incident on the circuit 9.

The ratio of components of the incident light which is expressed as:

Red (R) : Green (G) : Blue (B)  (5)

thus can be obtained to permit detection of the hue of the incident light.

In case of photographing with an illuminating device which generates a temporally continuant light, such as an illumination lamp, a photographing (or image pickup) operation is performed as described below with reference to FIG. 4 which is a flow chart of a sequence of processes:

When the power supply switch 13 (FIG. 1) is closed, the image pickup apparatus begins to operate (a step S1). The luminance of the object is measured by the photometric circuit 8 (a step S2). At a next step S3: A check is made to find whether the measured luminance of the object is below a predetermined value. If so, the ambient light which is illuminating the object from around it is sufficiently dark to permit photographing with illumination by the light source 10.

In this case, at a step S4, the white balance is set at a color temperature which obtains at the maximum light emission efficiency of the light source 10. The mode of the light source 10 is shifted to a mode in which it has the maximum light emission efficiency. At a step S5: The light source 10 is lighted up. At a step S6: The luminance of the object is again measured by the photometric circuit 8. At a step S7: A check is made to find whether the measured luminance of the object is within a photographable range. If the luminance is found to be outside of the photographable range of the image pickup apparatus (too bright or too dark), the flow of operation comes to a step S8. At the step S8: The intensity of the light of the light source 10 is adjusted. The flow then comes back to the step S6 to check for the lightness of the illumination. When the illumination by the light source 10 is found to be apposite to the object at the step S7, the flow comes to a step S17. At the step S17: The flow of operation awaits the operation of the release switch 14. When the release switch 14 is operated at the step S17, the flow proceeds to a step S18. At the step S18: The computing/control circuit 11 first causes the iris driver 2b to stop down the aperture of the iris 2a. At a step S19: Then, the computing/control circuit 11 causes the shutter driver 3b to drive the shutter 3a. The shutter 3a is then opened for a given period of time thus to have the image sensor 4 exposed to light. In this instance, the aperture value of the iris 2a and the exposure time of the shutter 3a are computed by the circuit 11 on the basis of information on the object's luminance obtained at the step S6 through the photometric circuit 8.

At a step S20: After completion of the exposure, the object's image is read out from the image sensor 4 in the form of an electrical signal at a suitable timing and is converted into a video signal of a prescribed form by the signal processing circuit 6. At a step S21: Then, the video signal is recorded by the recording circuit 7 on the recording medium. At a step S22: The photographing operation comes to an end.

In case that the ambient light of the object is found, at the step S3, to be not ignorably weak after light measurement is performed at the step S2, the embodiment operates as follows: In this case, since the influence of the color of the ambient light illuminating the object is not ignorable, the flow of operation comes to a step S10. At the step S10: The computing/control circuit 11 causes the colorimetric circuit 9 to measure the hue of the ambient light illuminating the object. At a step S11: On the basis of the colorimetric value thus measured, the control circuit 11 then sets the white balance of the signal processing circuit 6 and the color temperature (absolute temperature) of the light source 10. At a step S12: A check is made, on the basis of the value of light measured at the step S2, to find whether the object is photographable without the aid of the light source 10. At a step S13: If the aid of the light source is necessary, the light source 10 is lighted up. At steps S14 to S16: Then, the lightness of the light source 10 is adjusted to a photographable range of the image pickup apparatus through processes which are similar to those of the above stated steps S6 to S8. At steps S17 to S21: a photographing operation is carried out. In that instance, the parameter values of the iris 2a and the shutter 3a are computed by the computing/control circuit 11 on the basis of the measured light value obtained at the step S14.

Further, if it is found at the step S12 that the lightness is found to be sufficient for photographing without the aid of the light source 10, the flow of operation jumps to the step S17 to have the photographing processes carried out at the steps S17 to S21. In that event, the parameter values of the iris 2a and the shutter 3a are computed by the computing/control circuit 11 on the basis of the light value measured at the step S2.

Figure 5:
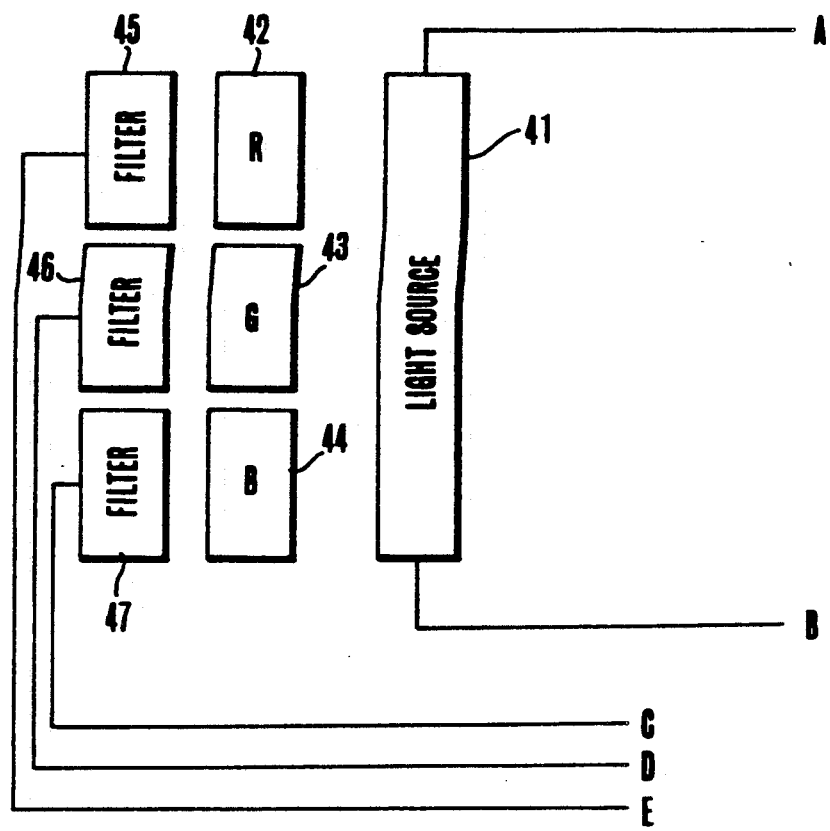
FIGS. 5 and 6 are diagrams showing two examples of arrangement of the light source of the embodiment.

The color temperature of the light source 10 is arranged to be set in a manner as described below with reference to FIGS. 5 and 6 which show the details of examples of the light source arranged to have the hue (color temperature) thereof variable respectively:

Referring to FIG. 5, a light source 41 is arranged to have its lightness (luminance intensity) variable by a voltage applied between electrodes A and B thereof. Reference numerals 42, 43 and 44 respectively denote color filters of, for example, red (R), green (G) and blue (B). Filters 45, 46 and 47 which have no hue are arranged to have their transmission factors variable by electrical signals applied to electrodes C, D and E.

With the light source arranged as shown in FIG. 5, the color temperature of the light source 10 is adjusted to the measured color value of the ambient light on the object in the following manner: The light intensity ratio among the colors red, green and blue is adjusted by adjusting the ratio among the transmission factors of the filters 45, 46 and 47. Then, the intensity of the light of the color temperature is adjusted (at each of the light adjusting steps S8 and S16 of FIG. 4) through the medium of the voltage applied between the electrodes A and B.

Figure 4:
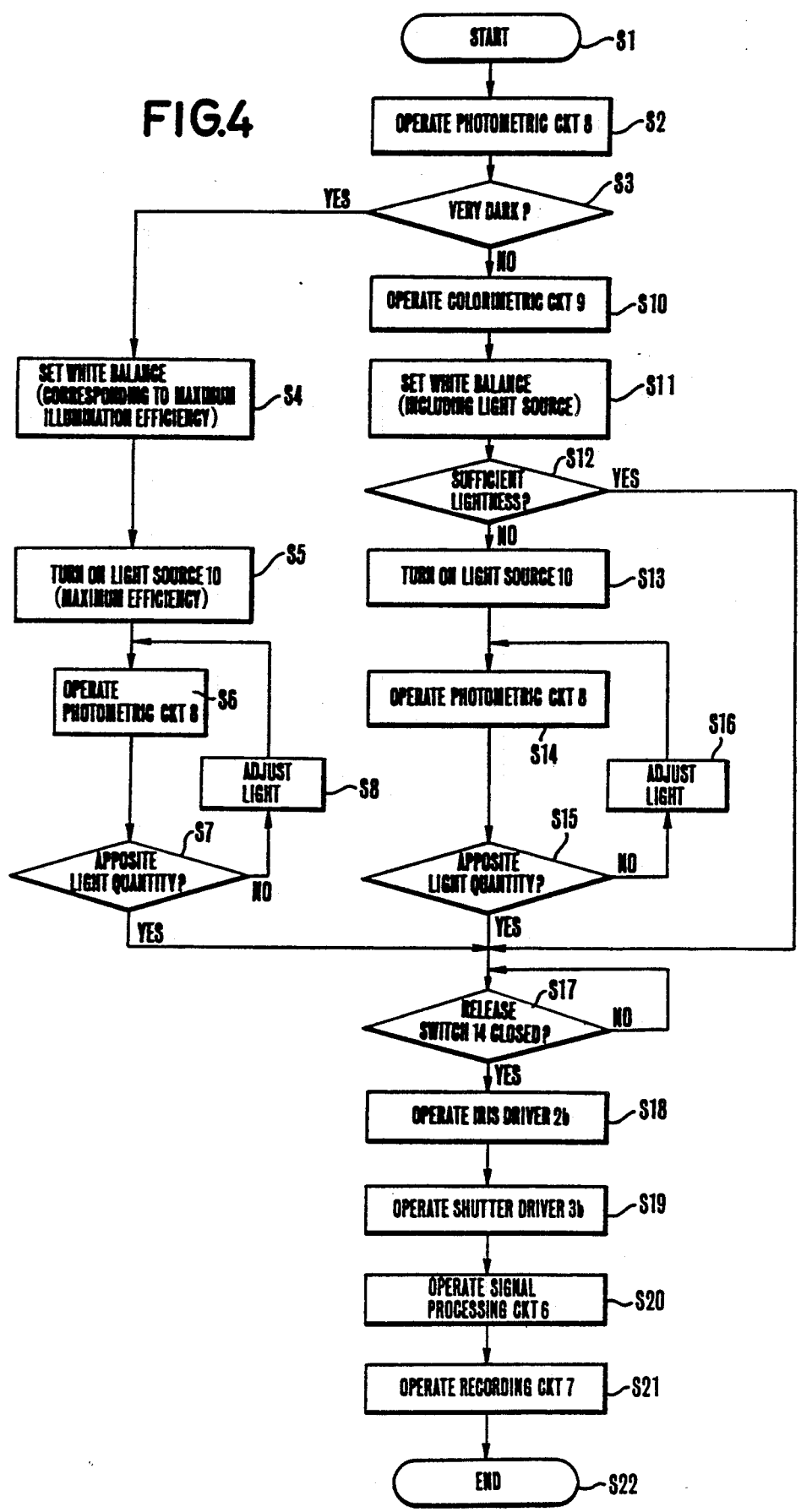
FIG. 4 is a flow chart showing a sequence of photographing processes of the embodiment.

Further, in the event of weak intensity of the ambient light, as in the case of "YES" at the step S3 of FIG. 4, the object is illuminated directly by the light of the light source 41 with all the filters 42 to 47 removed. Then, since the light is then not attenuated by any of the filters 42 to 47, the efficiency of illumination is greatly improved. In this instance the white balance of the image pickup apparatus is adjusted to the light of the light source 41. Data relative to this may be arranged to be supplied to a memory area provided within the computing/control circuit 11 of FIG. 1 from the light source 10.

Figure 6:
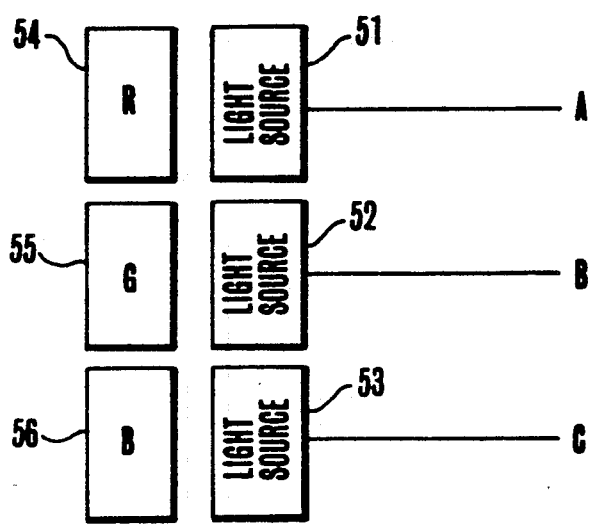

Referring now to FIG. 6, another method for changing the hue of the light source 10 is as follows: In this instance, a plurality of light sources 51, 52 and 53 are discretely arranged to have the luminance of their light emission variable by changing voltages applied to electrodes A, B and C respectively. Color filters 54, 55 and 56 are provided, for example, for red (R), green (G) and blue (B). With the light source arranged as shown in FIG. 6, the ratio (of color temperature) among the color components of red, green and blue of the light passing through the color filters 54, 55 and 56 is adjustable by changing a ratio among the voltages applied to the electrodes A, B and C. Light adjustment is carried out according to the light that increases the absolute values of voltages applied to the electrodes A, B and C.

Further, the light source arrangement of FIG. 5 may be changed as follows: By omitting the filters 43 and 46, illumination is effected mainly with a freely passing portion of light and the hue (color temperature) is adjusted with two colors. This modification lessens the degree of attenuation of light by virtue of omission of the filters 43 and 46 and yet still permits adjustment of hue.

In the case of FIG. 6, the same advantageous effect is attainable by omitting the color filter 55.

For further simplification of the light source arrangement, the light of the light source 41 or 52 may be arranged to have a tinge of cyan with the transmission factor or the lightness of the filter 45 or the light source 51 adjusted accordingly. In the event of this modification, the color filters 43 and 44 of FIG. 5 can be omitted and the filters 46 and 47 can be replaced with a one filter. As for the arrangement of FIG. 6, the color filters 55 and 56 and the light source 53 can be omitted by this modification.

Further, the arrangement of the light source shown in FIG. 5 or 6 may be changed to replace the color filter 42 or 54 with a magenta filter and the color filter 43 or 55 with a cyan filter. This change then makes the color filter 44 or 56 and the light source 53 omissible.

Further, in the case of FIG. 6, the light source 53 and the color filters 54, 55 and 56 are omissible if the light sources 51 and 52 are tinged with colors.

Figure 7:
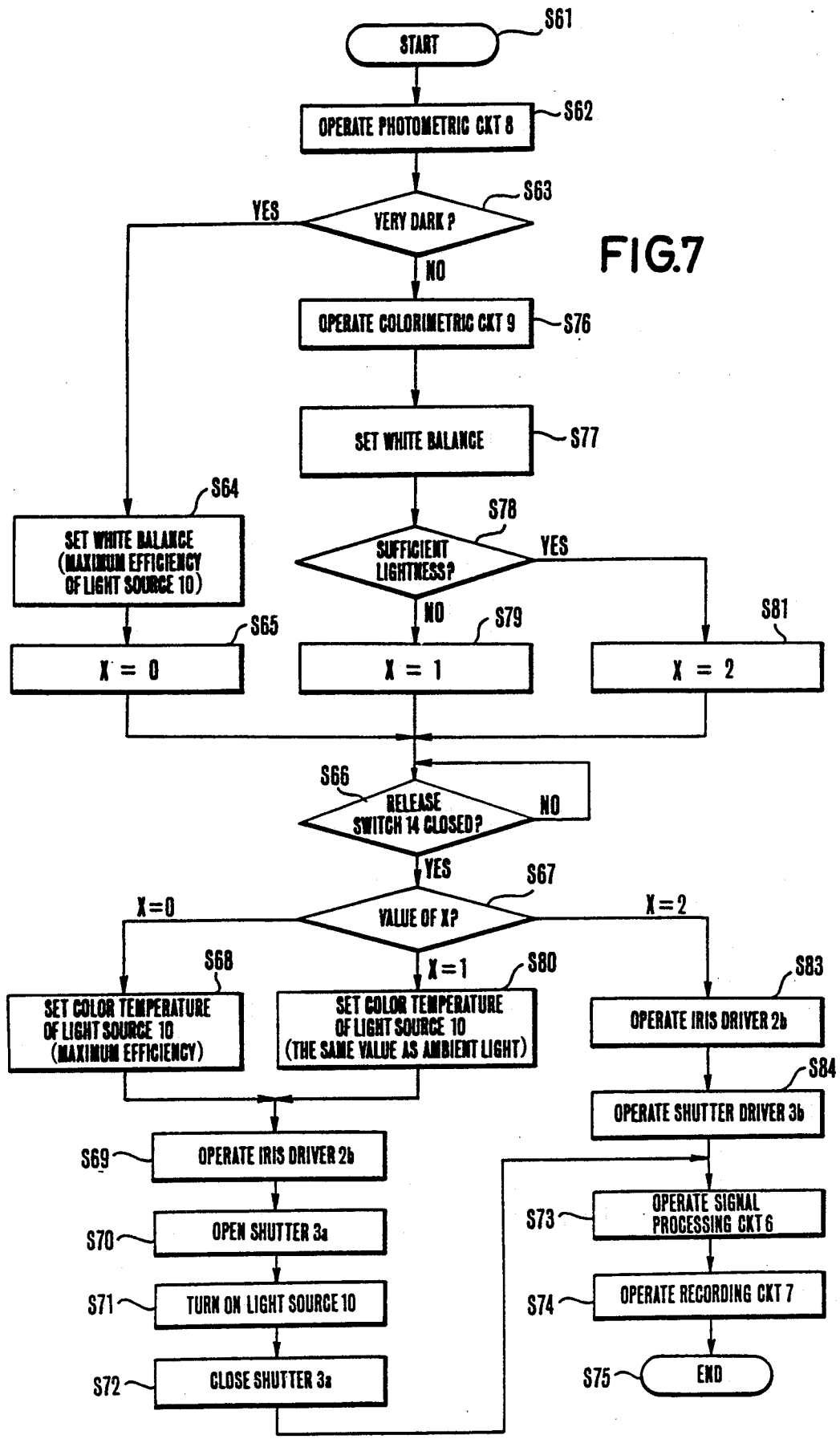
FIG. 7 is a flow chart showing another sequence of photographing processes.

Next, in case of photographing with an illumination device which is arranged to generate light in a pulse-like state like in the case of, for example, a flash device, the embodiment operates as follows: FIG. 7 is a flow chart showing by way of example a sequence of processes of such a photographing operation. The sequence of processes can be carried out by the electric circuit arrangement, etc. of the embodiment as shown in FIG. 1. Referring to FIG. 7, at a step S61: The image pickup apparatus begins to operate with the power supply switch 13 closed. At a step S62: The luminance of the object is measured by the photometric circuit 8. At a step S63: A check is made to find whether the lightness of the object is below a predetermined value. If the lightness is found to be lower than the predetermined value, it indicates that the ambient light illuminating the object from around it is sufficiently dark and ignorable thus permitting a photographing operation with the light source 10 under a condition ensuring the highest light emitting efficiency thereof. In that event, the flow of operation proceeds to a step S64. At the step S64: The computing/control circuit 11 sets the white balance of the signal processing circuit 6 at a value corresponding to this illuminating condition. At a step S65: After the white balance is set, a parameter X for discrimination of each case is set at 0. At a step S66: The flow waits for an operation on the release switch 14 (FIG. 1). At a step S66: The flow comes to this step when the release switch 14 is operated. At a step S67: A check is made for the value of the parameter X. Since, in this instance, the value of the parameter X is 0, the flow jumps to a step S68. At the step S68: The color temperature of the light source 10 is set in such a way as to obtain the maximum efficiency of the light source 10. At a step S69: The aperture of the iris 2a is stopped, for example, down to a value designated by the light source 10. At a step S70: The shutter 3a is opened. At a step S71: The light source 10 is caused to flash or emit light. At a step S72: The shutter 3a is closed after the light emission comes to a stop. At a step S73: After that, information on the image of the object is read out in the form of an electrical signal and is converted into a video signal by the signal processing circuit 6. At a step S74: The video signal is recorded on a recording medium by the recording circuit 7. At a step S75: The series of photographing processes comes to an end.

If the intensity of the ambient light is found not ignorable at the step S63, the flow of operation comes to a step S76. At the step S76: The color temperature of the ambient light is measured by the colorimetric circuit 9. At a step S77: The white balance of the signal processing circuit 6 is set on the basis of the measured value of color. At a step S78: Next, the light is checked on the basis of a measured photometric value obtained at the step S62 to find whether photographing is possible without the aid of the light source 10. At a step S79: If the result of the check made at the step S78 is in the negative (NO), the value of the discriminative parameter X is set at 1. At a step S66: The flow waits for an operation on the release switch 14. When the release switch 14 is operated, a next step is decided according to the value of the discriminative parameter X.

In this instance, since the value X is at 1 indicating that the influence of the ambient light is not ignorable, the flow comes to a step S80. At the step S80: The color temperature of the light source 10 is adjusted to a value apposite to the color temperature of the ambient light. After that, the steps S69 to S75 are executed in exactly the same manner as in the case of X=0.

In case that photographing is determined to be possible without the aid of the light source 10 at the step S78, the flow of operation comes to a step S81. At a step S81: The discriminative parameter X is set at 2 and the flow comes to the step S66 to wait for the operation on the release switch 14. When the release switch 14 is operated, a check is made for the value of the discriminative parameter X at the step S67.

Since the value of the discriminative parameter X is 2 in that instance, the flow jumps to a step S83. At a step S83: The iris 2a is stopped down to a parameter value computed by the computing/control circuit 11 according to the photometric value obtained at the step S62. At a step S84: The shutter 3a is driven to make an exposure. After that, the steps S73 to S75 are executed for photographing in exactly the same manner as in the cases of X=0 and X=1.

The flow of operation described is executable with the light source 10 arranged as shown in FIGS. 5 and 6 by using flash tubes as the light sources 41, 51, 52 and 53 instead of the continuously lighting lamps or the like. The advantage of improved efficiency which results from omission of the filters 46, 43 and 55 as mentioned in the foregoing is also attainable in this instance in the same manner as in the above stated case of using the continuously lighting light sources.

The embodiment described is capable of using the illuminating light source of the image pickup apparatus at the maximum rate of efficiency in the event of total absence of any ambient light. This prevents the light source from being wasted. In case that the ambient light is not ignorable, the embodiment uses its variable hue light source according to the ambient light. The embodiment is therefore capable of reproducing an image with good hue reproducibility and ensures a white balance apposite to both the ambient light and its own light source without necessitating any additional operation by the operator.

Figure 8:
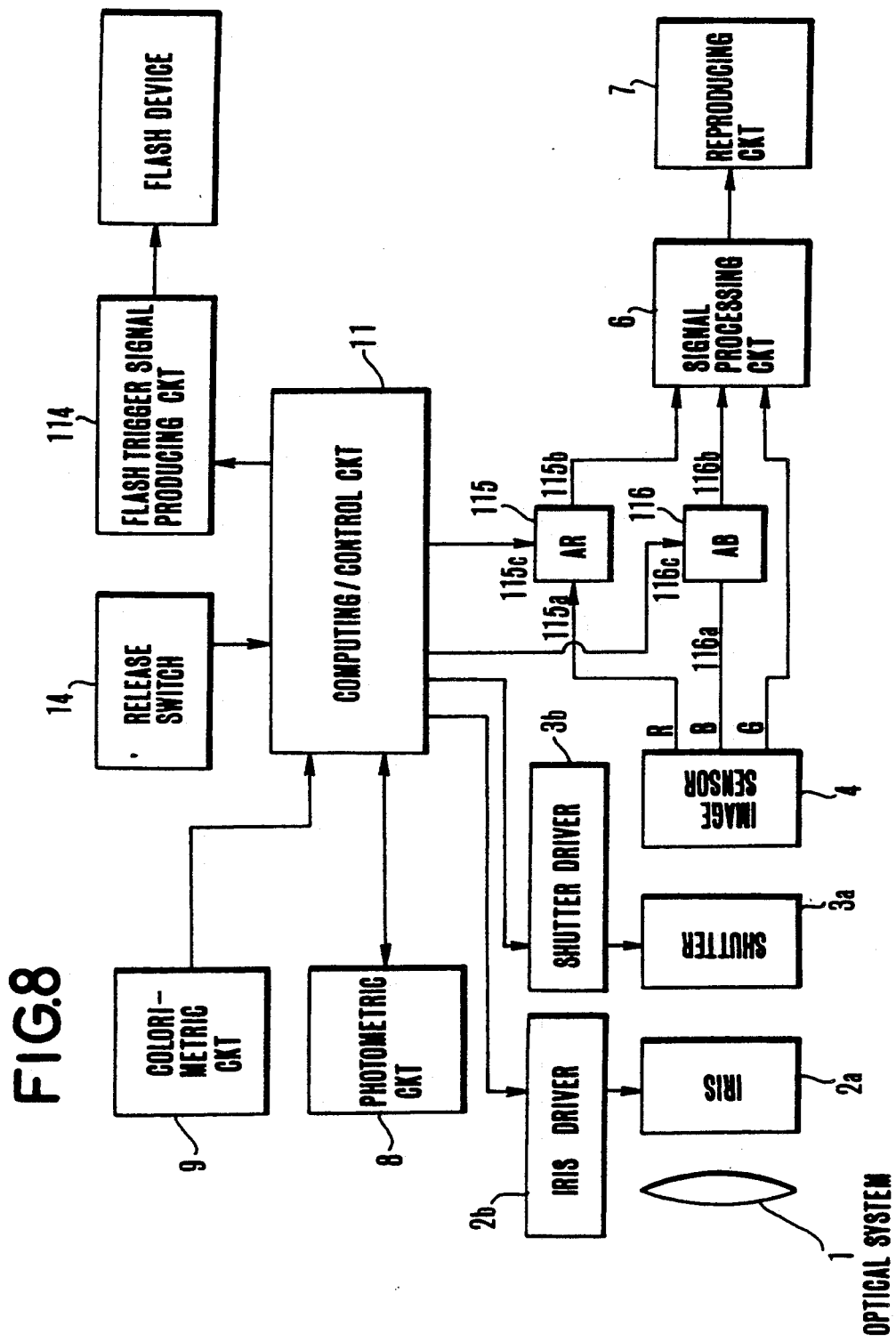
FIG. 8 is a block diagram showing the arrangement of a second embodiment of this invention.

Next, a second embodiment of this invention is described as follows: FIG. 8 shows the arrangement of the second embodiment in a block diagram. The same component elements as those shown in FIGS. 1 to 7 are indicated by the same reference numerals. The output of the image sensor 4 is divided, for example, into three primary colors including R (red), B (blue) and G (green). An amplifier 115 for a variable gain AR is inserted in a signal processing system for the primary color R. An amplifier 116 for a variable gain AB is inserted in a signal processing system for the primary color B. White balance adjustment is arranged to be carried out with the gains of the three primary color signals R, B and G balanced by adjusting the gains of the two amplifiers 115 and 116. A trigger signal producing circuit 114 is arranged for a flash device. The trigger signal producing circuit 114 is disposed behind the flash device. Upon receipt of a trigger signal from the terminal of the circuit 114, the flash device flashes and brings its flashing action to a stop when the amount of reflection light which comes from an object to be photographed as a result of flashing reaches a predetermined value.

Figure 9:
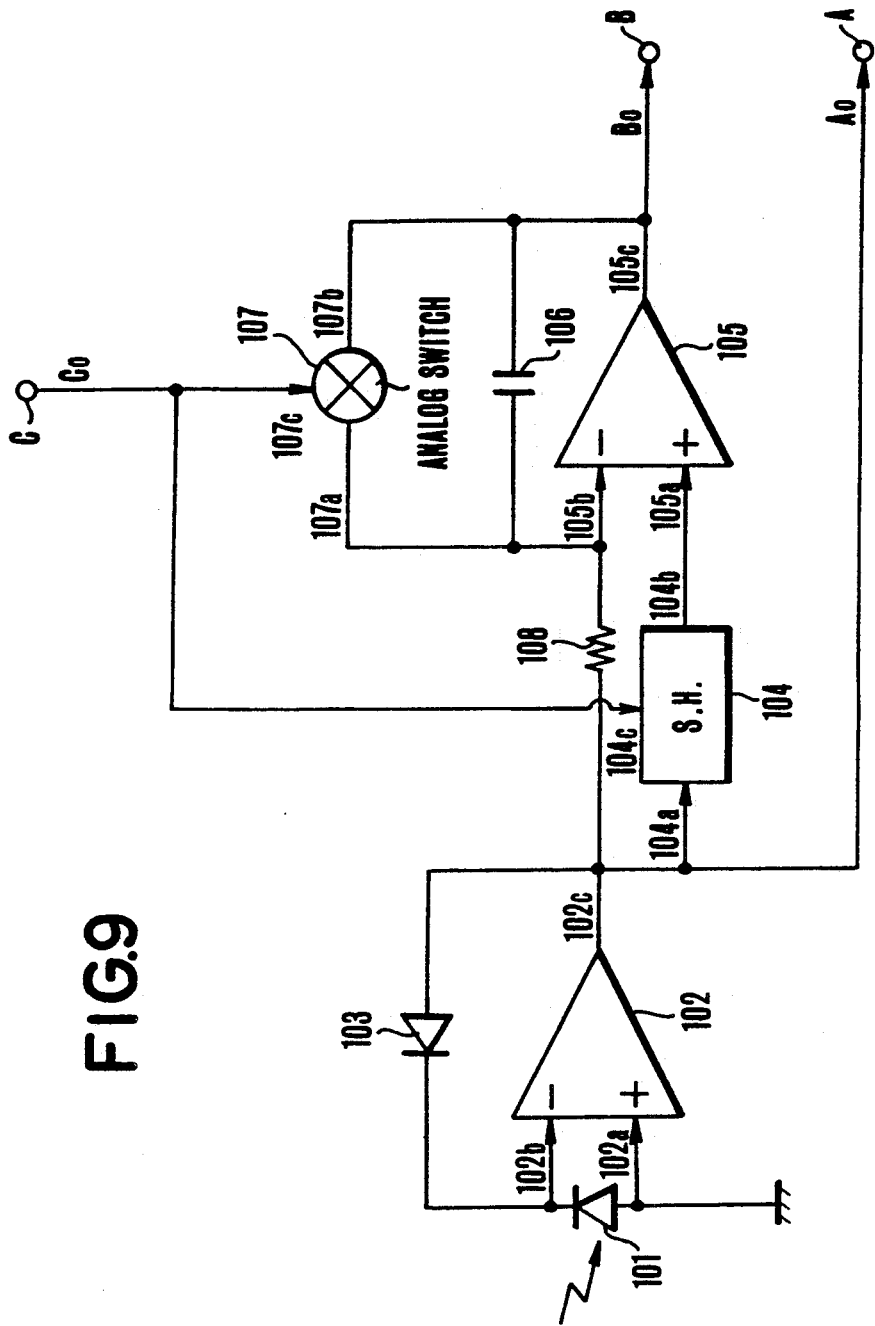
FIG. 9 is a circuit diagram showing the arrangement of a photometric circuit included in FIG. 8.

FIG. 9 is a circuit diagram showing the arrangement of the photometric circuit 8 included in FIG. 8. The illustration includes a light receiving element 101 which is, for example, an SPC or the like and is arranged to give a short-circuit current in proportion to the intensity of light incident thereon; operational amplifiers 102 and 105 which have non-inverting input terminals 102a and 105a, inverting input terminals 102b and 105b and output terminals 102c and 105c; and a diode 103.

The light receiving element 101, the operational amplifier 102 and the diode 103 jointly form a light receiving circuit which is arranged to produce a voltage in proportion to the logarithmic value of the intensity of the light received. The output voltage Ao of the light receiving circuit is arranged to be taken out from an output terminal A and to be supplied to the computing-/control circuit 11.

The photometric circuit 8 includes a sample-and-hold circuit 104. When the terminal 104c of the sample-and-hold circuit 104 is at a high level, the same voltage as the voltage of the input terminal 104a of the circuit 104 is generated at the output terminal 104b thereof. In case that the terminal 104c is at a low level, an input voltage which is obtained at a point of time when the terminal 104c changes from the high level to the low level is retained and produced as it is.

The circuit 8 further includes a capacitor 106; and an analog switch 107. A part between the terminals 107a and 107b of the analog switch 107 becomes conductive when the terminal 107c of the switch is at a high level and becomes non-conductive when the terminal 107c is at a low level. A reference numeral 108 denotes a resistor.

The operational amplifier 105, the capacitor 106 and the resistor 108 form an integrating circuit for measuring the amount of light obtained by flashing. The output Bo of the integrating circuit is arranged to be supplied via an output terminal B to the above stated computing-/control circuit 11. The terminal 104c of the sample-and-hold circuit 104 and the terminal 107c of the analog switch 107 are arranged in series and are also connected to the circuit 11 via the terminal C. These circuits are thus arranged to operate under a control signal Co which is produced from the computing/control circuit 11.

FIGS. 10(A) to 10(H) show in a timing chart the operation of the second embodiment shown in FIG. 8. Referring to these drawings, the image pickup apparatus drives the recording medium and renders the photometric and colorimetric circuits 8 and 9 operative when a power supply switch which is not shown is closed at a point of time T0 shown in FIG. 10(A). The measured value of ambient light is supplied from the output terminal of the photometric circuit 8 (i.e. from the terminal A of FIG. 9) to the computing/control circuit 11 while a measured color value is supplied to the circuit 11 from the colorimetric circuit 9.

Figure 10:
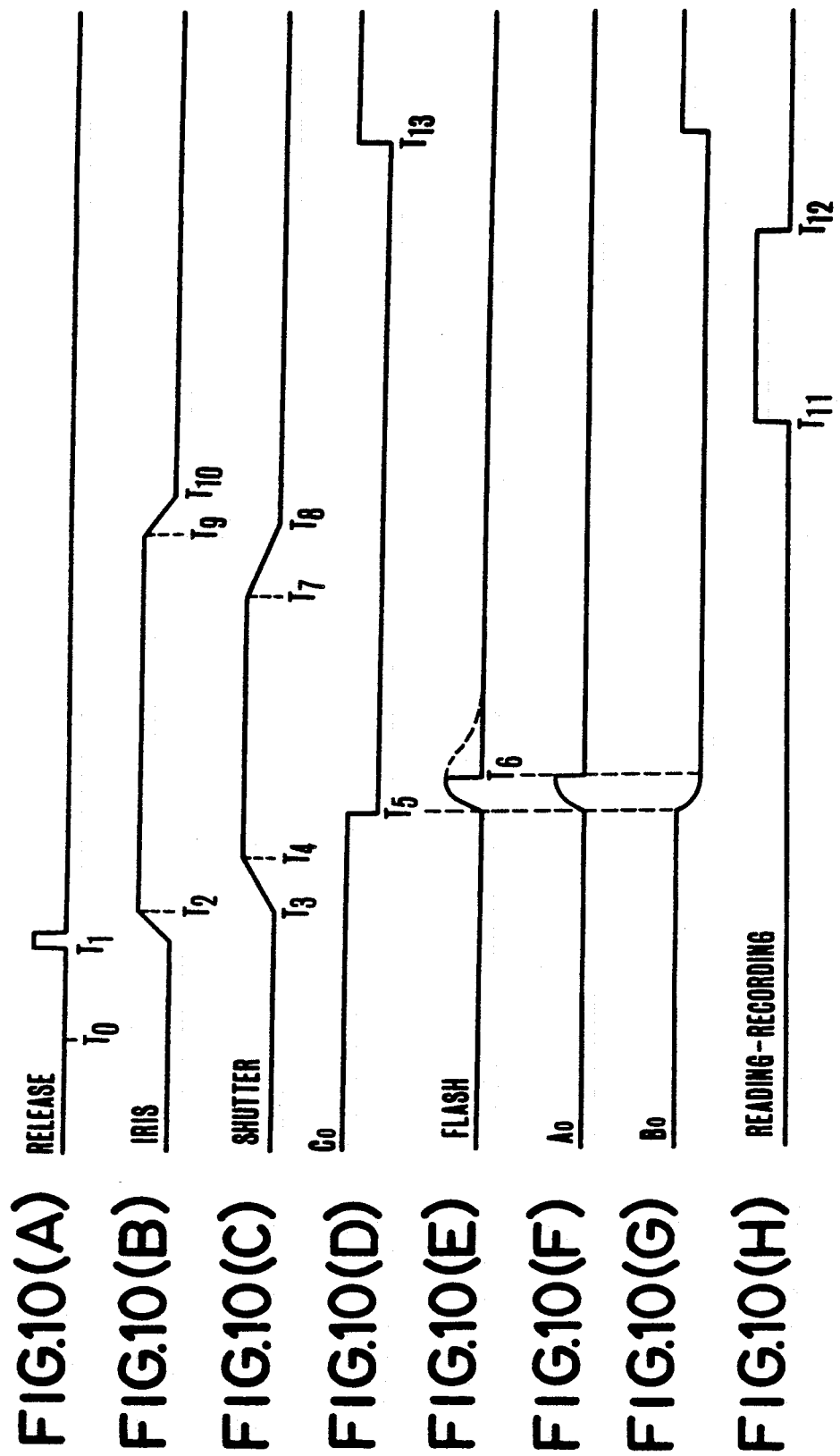
FIGS. 10(A) to 10(H) show in a timing chart the operation of the second embodiment.

When the release switch 14 is closed at a point of time T1 of FIG. 10(A), the computing/control circuit 11 immediately supplies a driving signal to the iris driver 2b. The iris 2a is stopped down. The aperture position of the iris 2a stabilizes when the iris 2a is stopped down to a given aperture value at another point of time T2 shown in FIG. 10(B). Then, immediately after that, at a point of time T3 of FIG. 10(C), the circuit 11 supplies a driving signal to the shutter driver 3b. The shutter 3a is then fully opened before a point of time T4. After the shutter 3a is fully opened, a control output signal Co is applied at a high level from the computing/control circuit 11 to the terminal C of FIG. 9. Then, the part between the terminals 107a and 107b of the analog switch 107 which has been conductive is rendered non-conductive by this high level signal. This brings the integrating circuit into a reset state. Then, the value of the light measurement output Ao obtained at a point of time T5 is kept as it is at the output terminal 104b of the sample-and-hold circuit 104.

At the same time, a trigger output is supplied from the trigger signal producing circuit 114 to the flash device. The flash device begins to flash and stops flashing when reflection light from the object reaches a predetermined value at a point of time T6. During a period between the time points T5 and T6, the integrating circuit which consists of the operational amplifier 105, the capacitor 106 and the resistor 108 operate as follows: When the level of the control terminal 104c of the sample-and-hold circuit 104 changes from a high level to a low level at the time point T5, the light measurement output Ao obtained at the time point T5 is kept at the non-inverting input terminal 105a of the operational amplifier 105.

Further, at the time point T5, the level of the control terminal 107c of the analog switch 107 changes from a high level to a low level. Therefore, the part between the terminals 107a and 107b of the analog switch 107 changes from a conductive state to a non-conductive state. The integrating circuit thus begins at the time point T5 to perform an integrating action on the basis of the light measurement value obtained at the time point T5. A difference between the value of the light measurement output Ao obtained after commencement of the integrating action and a previous value which has been obtained solely from the ambient light up to that point of time indicates the intensity of the flash light. The output Bo of the integrating circuit which is as shown in FIG. 10(G) indicates the integrated amount of flash light.

After flashing, the shutter 3a is closed at a time between time points T7 and T8 and the iris 2a' is again closed at a time between time points T9 and T10 as shown in FIGS. 10(C) and 10(B). Then, the output Bo of the integrating circuit is read out and taken into the computing/control circuit 11. Then, an intensity ratio between the lights with which the object is illuminated while the image- sensor 4 is exposed is computed as follows:

(luminance intensity obtained solely with the ambient light):(luminance intensity obtained solely with the flash light) = $l:m$ (6)

However, note that the computation must be on the basis of the following relation:

$$l+m=1 \quad (7)$$

Further, from the colorimetric value obtained for the ambient light by the colorimetric circuit 9, the gains for the white balance are assumed to be as follows:

$$AR : AB = AR1 : AB1 \quad (8).$$

The gains for the white balance which are for the flash light and read out, for example, from values stored in the form of data at a ROM within the computing/control circuit 11 are assumed to be as follows:

$$AR : AB = AR2 : AB2 \quad (9)$$

Then, a white balance adjusted taking into consideration both the contributions of ambient light and flash light is obtainable, for example, from the following formulas:

$$AR = AR1 \cdot l + AR2 \cdot m \quad (10)$$

$$AB = AB1 \cdot l + AB2 \cdot m \quad (11)$$

The formulas (10) and (11) may be amended by taking into consideration the intrinsic characteristic of the image sensor 4 and the characteristic of the color filter applied to the picture element points of the image sensor and a white balance thus obtained may be used.

For example, the variable gain amplifiers 115 and 116 may be arranged to have gains as expressed by the formulas (10) and (11) with signals for these gains supplied from the computing/control circuit 11 to the gain control terminals 115c and 116c of the variable gain amplifiers 115 and 116.

After that, during a period between time points T11 and T12 as shown in FIG. 10(H), an electrical signal obtained by converting an object's image during that period is read out. The electrical signal then has the white balance thereof adjusted by the variable gain amplifiers 115 and 116. After the white balance adjustment, the signal is processed by the signal processing circuit 6 and is recorded on a recording medium by the recording circuit 7. After the recording completion time point T12, the position of a recording head is shifted to an extent corresponding to one recording track. Then, at a time point T13, the level of the signal Co which comes to the control terminals 107c and 104c of the analog switch 107 and the sample-and-hold circuit 104 again becomes low. The low level signal Co renders the analog switch 107 conductive; causes the capacitor 106 to effect an electric discharge to reset the integrating circuit. The apparatus thus becomes ready for a next photographing operation.

In the second embodiment which is described above, the amount of illumination light is arranged to be integrated in a logarithmically compressed state. However, this arrangement may be changed to insert an exponential expansion circuit to use it in measuring the quantity of the flash light for increased accuracy.

As apparent from the foregoing, the second embodiment of this invention is also capable of adjusting each of the primary colors to appropriate color temperature by taking into consideration both the contributions made by two different illuminating lights even under an illuminating condition where the contribution of ambient light which is not ignorable coexists with that of the flash light. Therefore, photographing can be accomplished with an appropriate white balance.

Figure 11:
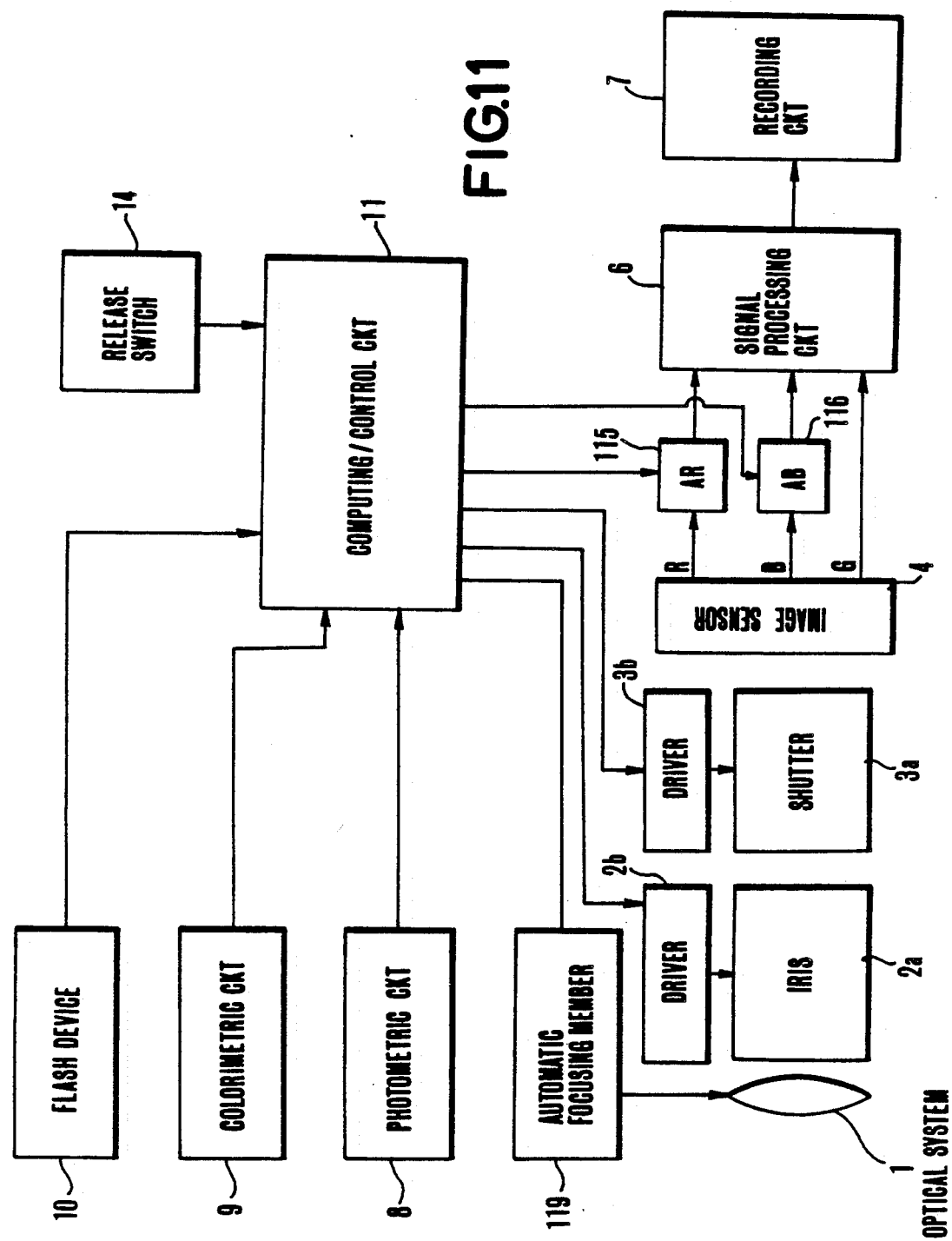
FIG. 11 is a block diagram showing the arrangement of a third embodiment of this invention.

A third embodiment of this invention is arranged as described below with reference to FIG. 11:

In the case of FIG. 11, an image pickup apparatus incorporating a flash device which flashes with a fixed (known) amount of light and an automatic focusing member 119 is arranged by way of example as the third embodiment. In FIG. 11, the same component parts as those of FIGS. 1 to 8 are indicated by the same reference numerals. The operation of the third embodiment is as follows: When the power supply is switched on, the photometric circuit 8 and the colorimetric circuit 9 operate to measure the lightness Bv of existing stationary illumination light and the color temperature (R : B : G : =AR1 : AB1 : 1) of the light. The results of measurement are supplied to the computing/control circuit 11.

After that, when the release switch 14 is operated, the automatic focusing member 119 operates to focus the optical system 1 by adjusting the position of it. The member 119 also measures a distance D to the object. The distance value D is also supplied to the circuit 11.

If the flash light quantity (G No.) of the flash device 10 is known, an aperture value (F No.) which gives an apposite exposure can be expressed as follows:

$$F \text{ No.} = (G \text{ No.}) / D \quad (12)$$

When the iris 2a is driven by the driver 2b to have an aperture as expressed by Formula (12) above, the flash device 10 is allowed to flash. After that the shutter 3a is closed. Information (an electrical signal) about the object which is collected over a period corresponding to one field or one frame is read out. The information thus obtained is converted by the signal processing circuit 6 into a signal form recordable on a recording medium. Then, the signal is recorded on the recording medium by the recording circuit 7.

The third embodiment is arranged to obtain the white balance in the following manner: With the object illuminating light intensity of the flash device 10 assumed to be $(G \text{ No.}/D)^2$, the ratio of which to the illuminating intensity of the ambient light can be expressed as follows:

$$Bv \cdot \left(\frac{G\,No.}{D}\right)^2 = p:q \quad (13)$$

$$p + q = 1 \quad (14)$$

The white balance for the data which is relative to flash light and stored at a storage such as a ROM within the control circuit 11 is assumed to be as expressed below:

$$R:B:G = AR2:AB2:1 \quad (15)$$

Then, the amplification degrees AR and AB of the amplifiers 115 and 116 are arranged to satisfy the following relations:

$$AR = pAR1 + qAR2 \quad (16)$$

$$AB = pAB1 + qAB2 \quad (17)$$

The above stated arrangement enables the third embodiment to obtain a white balance which is approximately in accordance with both the contributions to be made by the ambient light and the flash light.

Referring to Formulas (16) and (17) above, it is preferable to make the values of p and q most apposite by inserting in Formula (13) some corrective term, taking the characteristic of the image sensor into consideration.

As obvious from the foregoing, the third embodiment is capable of obtaining a correct white balance which is automatically and accurately weighted even in cases where both the contributions of the ambient light and the flash light are not ignorable.

Figure 12:
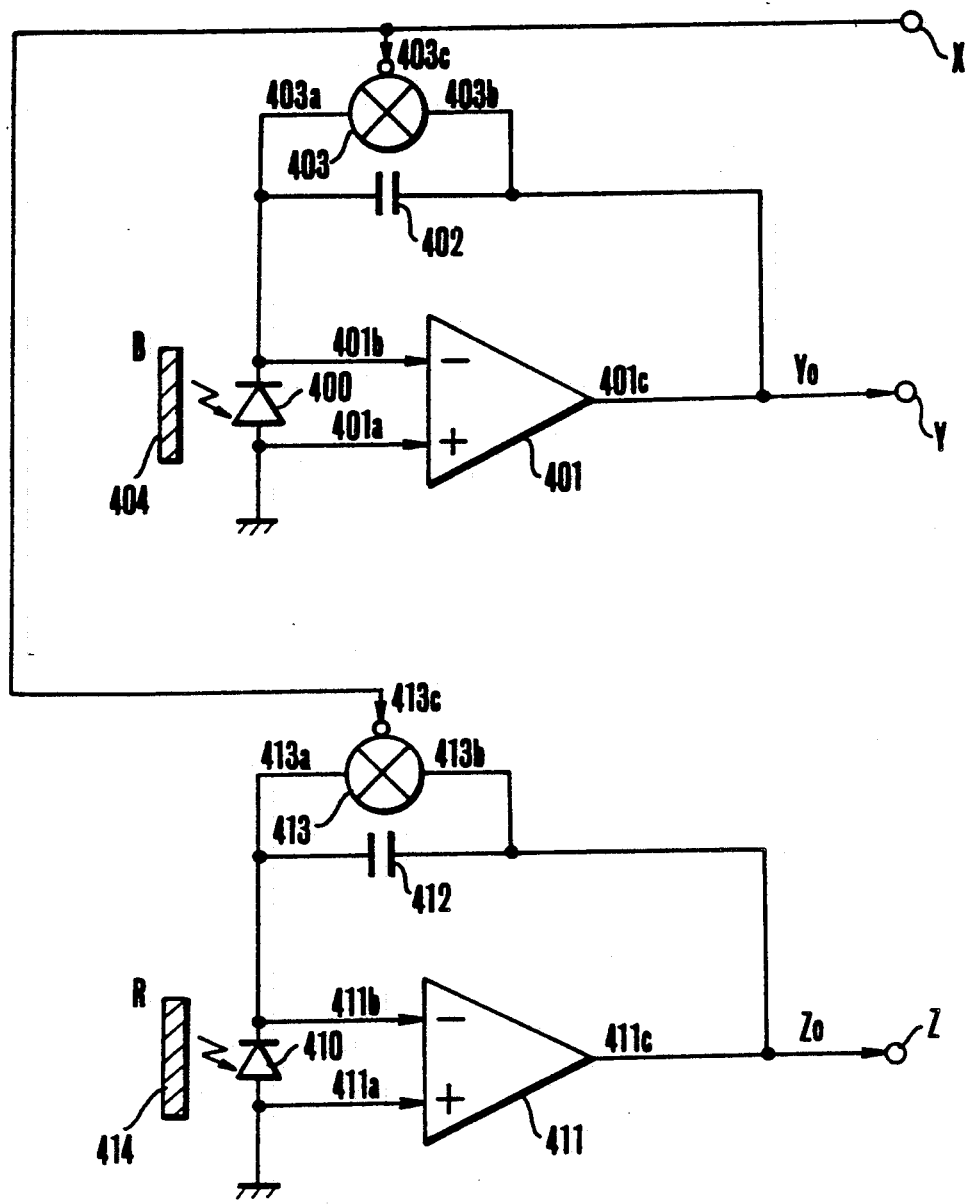
FIG. 12 is a circuit diagram showing the arrangement of the colorimetric circuit of the third embodiment.

FIG. 12 is a circuit diagram showing by way of example the details of the colorimetric circuit 9 of FIG. 11. As shown, the colorimetric circuit 9 includes light receiving elements 400 and 410 which are, for example, SPCs or the like and are arranged to have short-circuit currents in proportion to the intensity of light incident thereon; operational amplifiers 401 and 411 which respectively have non-inverting input terminals 401a and 411a, inverting terminals 401b and 411b and output terminals 401c and 411c; capacitors 402 and 412; and analog switches 403 and 413. Parts between the terminals 403a and 403b and between the terminals 413a and 413b of these switches become conductive when other terminals 403c and 413c are at a low level and become non-conductive when the terminals 403c and 413c are at a high level respectively.

The terminals 403c and 413c of the analog switches 403 and 413 are connected in common to the terminal of the computing/control circuit 11. Color filters 404 and 414 are provided for blue (B) and red (R) and are arranged to select the colors of light incident on the light receiving elements 400 and 410.

The group of elements 401 to 404 and another group of elements 410 to 414 respectively form integrating circuits for integrating photo currents which are in proportion to the light quantities of blue (B) and red (R). These integrating circuits are in a reset state when the analog switches 403 and 413 are conductive and in an integrating state when these switches are non-conductive.

Figure 13:
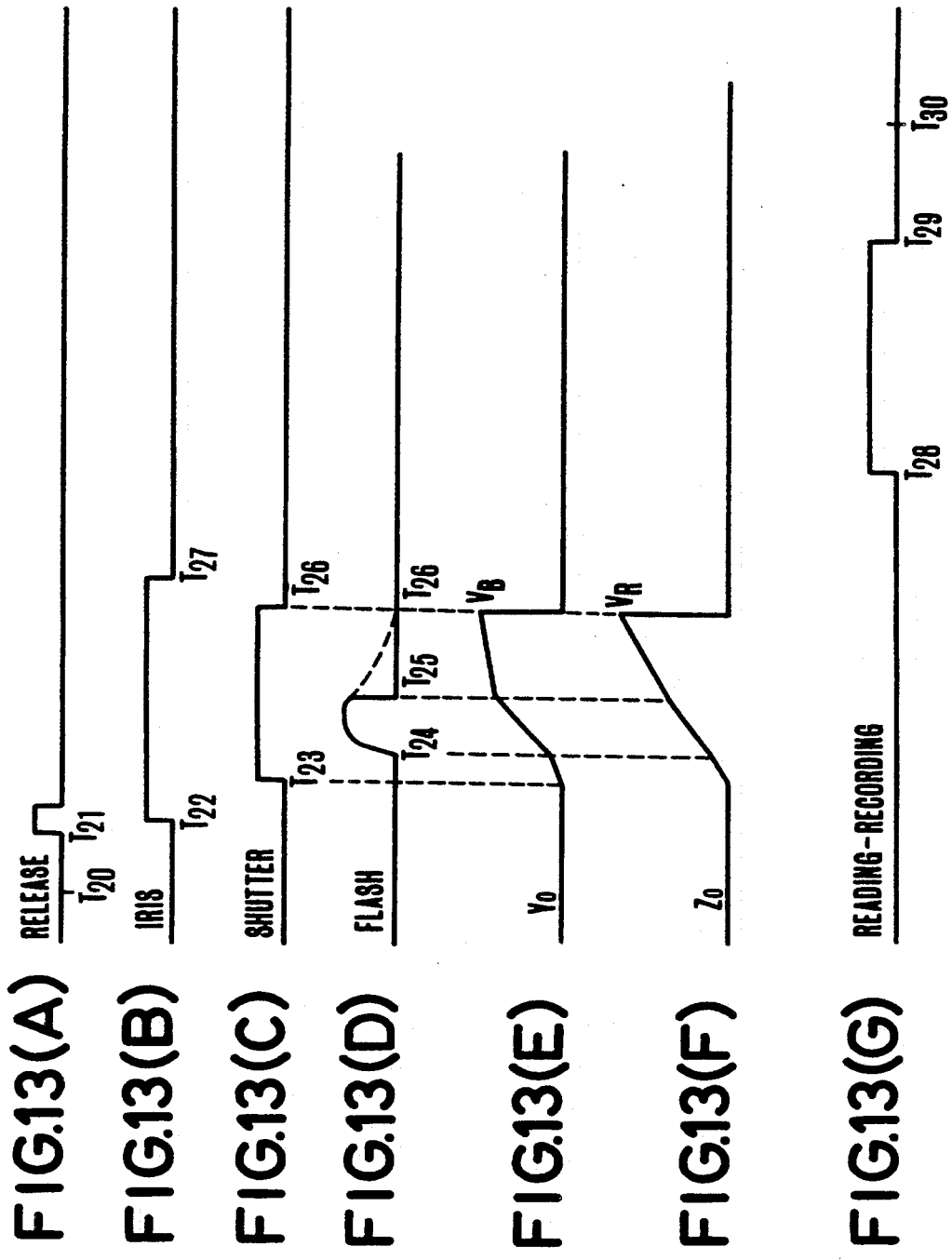
FIGS. 13(A) to 13(G) show in a timing chart the operation of a fourth embodiment of this invention which employs the arrangement shown in FIG. 12.

FIGS. 13(A) to 13(G) show in a timing chart the operation of a fourth embodiment of this invention which is arranged as shown in FIG. 12. This embodiment operates as described below with reference to FIGS. 8, 12 and 13(A) to 13(G):

When a power supply switch which is not shown is closed at a point of time T20 shown in FIG. 13(A), the image pickup apparatus comes to drive a recording medium.

Next, when the release switch 14 is closed at a time point T21 shown in FIG. 13(A), the computing/control circuit 11 immediately supplies a driving signal to the iris driver 2b. The iris 2a is almost instantly stopped down. The iris aperture is stopped down to a given value and stabilizes at a time point T22 shown in FIG. 13(B). Immediately after that, the control circuit 11 supplies a driving signal to the shutter driver 3b at a time point T23 which is shown in FIG. 13(C). Then, the shutter 3a fully opens almost instantly and almost instantly closes at a time point T26. A period from the time point T23 to the time point T26 is an exposure time for the image sensor 4.

When the shutter 3a fully opens at the time point T23, the level of a signal from the control circuit 11 to the terminal x of FIG. 12 becomes high. This high level signal renders non-conductive the parts between the terminals 403a and 403b of the analog switch 403 and between the terminals 413a and 413b of another switch 413 which have been conductive. The integrating circuits then change from a reset state to an operative state.

Then, at a time point T24 of FIG. 13(D), a trigger signal is supplied from the trigger signal producing circuit 114 to the flash device. The flash device begins to flash. The flashing action comes to a stop when a reflection light coming from the object reaches a predetermined value at a time point T25.

During a period from the time point T23 to the time point T26, the integrating circuits which consist of the operational amplifiers 401 and 411 and capacitors 402 and 412 operate as follows: The conductive state of the analog switches 403 and 413 changes as mentioned above to the non-conductive state at the time point T23. This change causes the integrating circuits to begin to operate for the two primary color signals R and B. Then, the levels of signal outputs Yo and Zo which are supplied from the integrating circuits to terminals Y and Z come to increase as shown in FIGS. 13(E) and 13(F).

After this, the integrating circuit outputs Yo and Zo come to rapidly increase during a period between the time points T24 and T25 as the flash device then flashes. During a next period between the time points T25 and T26, the integrating circuit outputs Yo and Zo again comes to moderately increase as the flashing action of the flash device then has come to an end.

At the time point T26, the outputs Yo and Zo reach the integrated values VB and VR for the blue and red components of the illumination light illuminating the object while the image sensor 4 is exposed. The data of these values are then taken in by the computing/control circuit 11. The circuit 11 then computes the color temperature of the illumination light according to the following relation: (intensity of blue component light):(intensity of red component light) = VB : VR. Then, the gains of the variable gain amplifiers 115 and 116 is adjusted to obtain gains AR and AB on the basis of the computed color temperature. As a result, there are produced primary color signals R and B which are amplified according to these gain values AR and AB.

Figure 14:
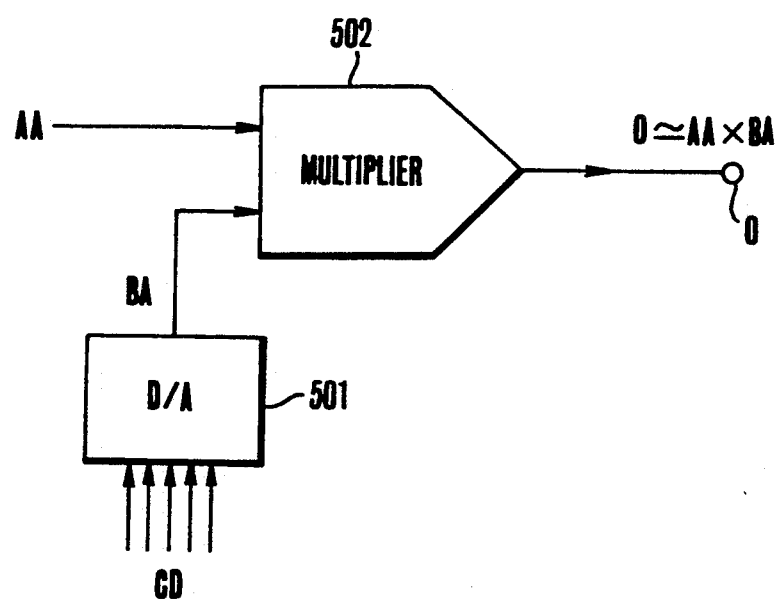
FIG. 14 is a block diagram showing the arrangement of a variable gain amplifier which is included in the arrangement shown in FIG. 8.

An example of the details of the variable gain amplifier is as follows: FIG. 14 shows in a block diagram the arrangement of the variable gain amplifier 115 or 116 which is shown in FIG. 8. Referring to FIG. 14, in case that the output of the control circuit 11 of FIG. 8 to be applied to the terminals 115c and 116c of the variable gain amplifiers 115 and 116 is a digital signal, a D/A converter 501 is arranged to convert the digital output into analog signal BA which corresponds to a digital signal CD. This D/A converter 501 of course may be disposed within the computing/control circuit 11. An analog multiplier 502 is arranged in a known manner to receive two input voltage signals AA and BA and to produce to a terminal O a voltage which is proportional to a product obtained from the two input voltage signals. This can be expressed as follows: $O \simeq AA \times BA$, wherein AA represents a video signal R or B coming from the image sensor 4; and BA a gain control signal obtained on the basis of the green color signal (G) which corresponds to the object illuminating light and produced from the computing/control circuit 11.

With the shutter 3a closed, the exposure of the image sensor 4 comes to an end at the time point T26 of FIG. 13(C). The analog switches 403 and 413 which have been non-conductive then becomes conductive to again reset the integrating circuits for the primary colors R and B. Their outputs Yo and Zo become almost zero (FIGS. 13(E) and 13(F)). Then, at a time point T27, the iris 2a again opens. Following that, during a period between time points T28 and T29 as shown in FIG. 13(G), an electrical signal which is obtained at the image sensor 4 by converting an image of the object is read out. The white balance of the signal is adjusted by means of the variable gain amplifiers 115 and 116. The adjusted signal is processed by the signal processing circuit 6 and is then recorded on a recording medium by the recording circuit 7. After completion of recording at the time point T29, the position of the recording head is shifted to an extent corresponding to one recording track. The apparatus then waits for a next photographing operation at a time point T30 of FIG. 13(G).

In the case of this embodiment, one of the integrating capacitors 402 and 412 is used. In cases where a broader dynamic range is desirable, however, a plurality of integrating capacitors may be arranged and a switch operation may be arranged to be controlled by the output of the photometric circuit 8.

Further, in that event, a logarithmic compression diode may be arranged to be covered by the switch operation. Then, for the measurement of the flash light quantity, the integrator arrangement may be replaced with direct colorimetric arrangement; while, for the measurement of the ambient light, a colorimetric action may be performed by using this logarithmic compression diode.

While the colorimetric circuit of the embodiment is described, for the sake of simplification of illustration, as arranged to measure two primary colors, this arrangement may be changed to measure three primary colors for improved accuracy.

In case that the color filter used for the image sensor is for a complementary color, the color measurement may be accomplished by using the complementary color.

As apparent from the foregoing description, the embodiment is also capable of accomplishing color photographing with an apposite white balance which is obtained by adjusting each primary color to color temperature corresponding to degrees of contribution made by both the ambient light and the flash light even under an illuminating condition wherein the ambient light is contributing to the illumination to a degree not ignorable in addition to the contribution to be made by the flash light.

What is claimed is:

1. An image pickup apparatus, comprising:
   (a) a memory for storing a color temperature data of a flash light;
   (b) detecting means for detecting an ambient color temperature data under a state where the flash light is not emitted; and
   (c) white balance control means for effecting white balance control of an image signal by using the color temperature data stored in said memory and the ambient color temperature data detected by said detecting means.

2. An apparatus according to claim 1, wherein said detecting means includes a plurality of color sensors which have different spectral characteristics from each other.

3. An apparatus according to claim 2, wherein said plurality of color sensors include a R color sensor and a B color sensor.

4. An apparatus according to claim 3, wherein said plurality of color sensors further includes a G color sensor.

5. An apparatus according to claim 1, wherein said white balance control means includes image sensing means arranged to convert an optical image into an image signal.

6. An apparatus according to claim 5, wherein said white balance control means is arranged to control relative gains of respective colors contained in the image signal formed by the image sensing means.

7. An apparatus according to claim 5, further including:
   a brightness detector for detecting a brightness of an ambient light.

8. An apparatus according to claim 7, wherein said white balance control means is arranged to control white balance, by using an output of said brightness detector.

9. An image pickup apparatus, comprising:
   (a) a memory for storing a color temperature data of a flash light;
   (b) detecting means for detecting an ambient color temperature data under a state where the flash light is not emitted;
   (c) brightness detecting means for detecting a brightness of an object; and
   (d) white balance control means for controlling a white balance of an image signal in accordance with the color temperature data stored in said memory, the ambient color temperature data detected by said detecting means and the brightness detected by said brightness detecting means.

10. An apparatus according to claim 9, wherein said detecting means includes a plurality of color sensors which have different spectral characteristics from each other.

11. An apparatus according to claim 10, wherein said plurality of color sensors include a R color sensor and a B color sensor.

12. An apparatus according to claim 11, wherein said plurality of color sensors further includes a G color sensor.

13. An apparatus according to claim 9, wherein said white balance control means includes image sensing means arranged to convert an optical image into an image signal.

14. An apparatus according to claim 13, wherein said white balance control means is arranged to control relative gains of respective colors contained in the image signal formed by the image sensing means.

* * * * *